United States Patent [19]
Knowd et al.

[11] 3,747,703
[45] July 24, 1973

[54] NOISE EXPOSURE COMPUTER AND METHOD

[75] Inventors: Michael J. Knowd, New Brighton; Charles E. Sullivan, Roseville, both of Minn.

[73] Assignee: Minnesota Mining and Manufacturing Company, St. Paul, Minn.

[22] Filed: Jan. 18, 1971

[21] Appl. No.: 107,336

[52] U.S. Cl. .............................. 181/.5 AP, 340/261
[51] Int. Cl. .............................. G08b 13/00
[58] Field of Search .............................. 181/.5 AP, .5 R; 340/261, 258 D

[56] References Cited

UNITED STATES PATENTS

| | | | |
|---|---|---|---|
| 2,982,914 | 4/1961 | Stewart | 181/.5 AP |
| 3,144,089 | 8/1964 | Lane et al. | 181/.5 AP |
| 3,014,550 | 12/1961 | Gales et al. | 181/.5 AP |

*Primary Examiner*—Benjamin A. Borchelt
*Assistant Examiner*—J. V. Doramus
*Attorney*—Kinney, Alexander, Sell, Steldt & Delahunt

[57] ABSTRACT

A portable, fully automatic instrument for at any given time determining precisely a person's cumulative noise exposure as a percentage of permissible noise exposure is disclosed. The instrument includes a microphone for sensing sound levels, a sound level measuring circuit, a weighting circuit, a rectifying circuit, a variable-gain ratio amplifier, a noise threshold level circuit for removing from consideration the noise levels below a predetermined threshold level, a converter output circuit, and a readout device for indicating the cumulative percentage of allowable noise exposure that has been experienced. The instrument converts incident sound level pressures in excess of the predetermined threshold level for the time periods of occurrence of the various sound levels into a representation indicative of a cumulative percentage of permissible noise exposure. A method for sensing sound levels above a predetermined threshold, providing a continuous summation of the sound levels for their respective time periods of occurrence, and conversion of the resultant summation to a cumulative percentage of permissible noise exposure is also disclosed.

22 Claims, 10 Drawing Figures

INVENTORS
MICHAEL J. KNOWD
CHARLES E. SULLIVAN
BY Charles A. Johnson
ATTORNEY

NOISE EXPOSURE COMPUTER AND METHOD

BACKGROUND OF THE INVENTION

1. Field Of The Invention

This invention relates generally to the field of sound level monitoring; and, more specifically, relates to the field of monitoring sound levels above predetermined threshold levels and calculating the percentage of total permissible sound level exposure that has been experienced as a result of the cumultive levels and durations of the sounds monitored.

2. Description Of The Prior Art

The prior art has recognized that damage can be done to the human ear as a result of exposure to excessive levels of noise over extended periods of time. It has generally been agreed that noise levels at which ear damage begins is a function of frequency, with higher noise levels being tolerated at lower frequencies than that which can be tolerated at higher frequencies. To evaluate damaging noise exposure it is necessary to know the integrated noise exposure of each exposed individual, where the integrated exposure is a product of a certain function of sound times the period of exposure.

Prior art practiced to evaluate noise level exposure was generally to employ point-by-point surveys of the noise field using sound level meters and frequency analyzers. Data obtained were then plotted as noise level contours, specifying areas of various noise levels. In order to apply the noise data to individuals, it was then necessary to determine the time spent by the individual in each area. Obviously, for intermittent or varying noise levels at given areas, and for personnel that would move regularly to different areas, a very difficult problem of noise exposure calculation would result.

One type of noise exposure meter available to the prior art to solve the problem of this type of noise exposure calculation utilizes a microphone for sensing the ambient noise levels and providing electrical signals that can be appropriately frequency weighted and subsequently rectified. The rectified signal is then applied to an electro-chemical measuring an indicating device. Its measuring function is integration and results from the fact that electricity flowing through the cell in a given time is equal to the integral of the current over that time. The indicator function of the electrolytic cell is brought about by the addition to the electrolyte of a chemical indicator substance which changes color concurrent with the chemical reaction which takes place on the electrolyte on passage of current therethrough. The amount of color change along a scale then indicates the dosage of noise for the period. While this prior art device is portable, the cell must be replaced for each monitored period, the noise level response is not weighted, and the readout of noise exposure is not susceptible of enough accuracy to comply with present noise exposure legal requirements.

Another type of noise exposure monitor that has been developed in the prior art provides for sensing noise levels within predetermined noise level ranges and measuring the time duration of occurrence of noise levels sensed within the monitored ranges. The ranges are manually selected by an operator making switch position selections, and suffers from the disadvantage of failing to detect or monitor noise levels that occur outside the selected range. This type of monitor is also relatively large and is intended to be set up to monitor noise levels at a given location, and is not intended for being carried on the person to monitor sound levels experienced by the person at the various places the individual might be during a regular working day. Since the noise level ranges must be manually switched, it would require several periods of testing to provide meaningful noise exposure data for a fixed location, and would be totally ineffective to provide noise exposure data where noise levels are varying over relatively wide ranges, and where the range changes would be required relatively frequently.

Federal legislation, in the form of revisions to the Walsh-Healy Public Contracts Act passed in 1969, setting noise level exposure standards for individuals has brought the problem of noise exposure for individuals into concentrated consideration. Regulations set forth in this legislation specify levels of noise exposure for prescribed exposure time periods as maximum permissible noise exposures. These regulations also indicate that where two or more periods of noise exposure of different levels occur, their combined effect must be considered rather than just considering the effect of each. The sum of the fractions calculated by dividing the duration of each noise level by the maximum permissible duration of exposure for that noise level must be calculated. When the sum of the fractions exceeds unity, the mixed exposure has exceeded the maximum permissible noise exposure.

In attempting to deal with the Federal regulations, systems have been developed for monitoring noise exposures and providing indications of the total percentage of permissible noise exposure that has been encountered by the monitoring system. These systems, however, are designed and constructed to monitor noise exposures at specific physical locations, since the systems are too large and bulky to be worn on the person, and have their microphones mounted on the cases of the instruments. Accordingly, these systems are ineffective to monitor the total noise exposure of a person that is required to move to various locations as he works. Further, they fail to take into account the differences in noise levels that might be experienced by individuals due to their physical separation from the location of the monitoring system.

SUMMARY

In summary, then, the invention comprises a fully automatic instrument that can be worn on the person for at any given time providing a precise determination of the person's cumulative noise exposure as a percentage of permissible noise exposure in accord with the regulations contained in the Walsh-Healy Public Contracts Act, and includes a microphone for sensing sound levels, sound level measuring circuitry together with A weighting circuits, rectifying circuitry for forming DC levels, variable-gain ratio amplifier circuitry for providing variable amplification factors for predetermined noise level intervals, noise level threshold circuitry for removing from consideration noise levels below predetermined threshold levels, a converter output circuit for integrating the current output from the variable-gain ratio amplifier circuitry, and a readout device for indicating the cumulative percentage of allowable noise exposure that has been experienced. The invention also comprises an improved method for sensing noise exposure levels above a predetermined threshold, weighting the signal for predetermined frequency ranges, automatically providing a continuous summation of the fractions that are calculated by measuring the duration of the noise levels as they occur and dividing by the maximum permissible duration for the occurring noise level, and providing the continuous summation as a cumulative percentage of permissible noise exposure.

A primary object of this invention, then, is to provide a fully automatic instrument that can be worn on the person for at any given time providing a precise determination of the person's cumulative noise exposure as a percentage of permissible noise exposure. Yet another object of this invention is to provide a noise exposure computer instrument that is sufficiently small in size and light in weight to enable it to be worn on the person of an individual as he goes about his normal activities moving from area to area. Still another object of this invention is to provide a noise monitoring instrument that can be worn on the person with the microphone supported as close to the wearer's ears as is feasible for providing the most accurate sensing of the noise exposure of the wearer. Yet another object of this invention is to provide a noise exposure computer instrument that provides the wearer's cumulative noise exposure as a percentage of permissible noise exposure as a visually readable percentage figure. Still a further object of this invention is to provide an improved noise exposure computer instrument that is capable of being worn on the person and fully automatic to provide a continuous summation of the fractions tbat are calculated by measuring the duration of the noise levels as they occur and dividing by the maximum permissible duration for the occurring noise levels and displaying the continuous summation as a visually readable cumulative percentage of permissible noise exposure. Still another object of this invention is to provide a novel noise exposure computer instrument having an improved variable-gain ratio amplifier for providing variable amplification factors for noise level intervals. Yet another object of this invention is to provide a fully automatic noise exposure computer instrument that can be worn on the person for measuring the wearer's exposure to noise levels in accordance with permissible noise exposure durations set forth in the Walsh-Healy Public Contracts Act. Still a further object of this invention is to provide an improved method for sensing noise exposure levels above a predetermiend threshold and automatically providing a continuous summation of the fractions that are calcuated by measuring the duration of the noise levels as they occur and dividing by the maximum permissible duration for the occurring noise level, as defined in the Walsh-Healy Public Contracts Act, and providing a continuous indication as a cumulative percentage of permissible noise exposure.

BRIEF DESCRIPTION OF THE DRAWINGS

The foregoing objectives of the invention, together with other more detailed and specific objectives of the invention, will become apparent from a consideration of the following detailed description of the invention when viewed in light of the drawings, in which.

DESCRIPTION OF THE PREFERRED EMBODIMENTS

Figure 1:
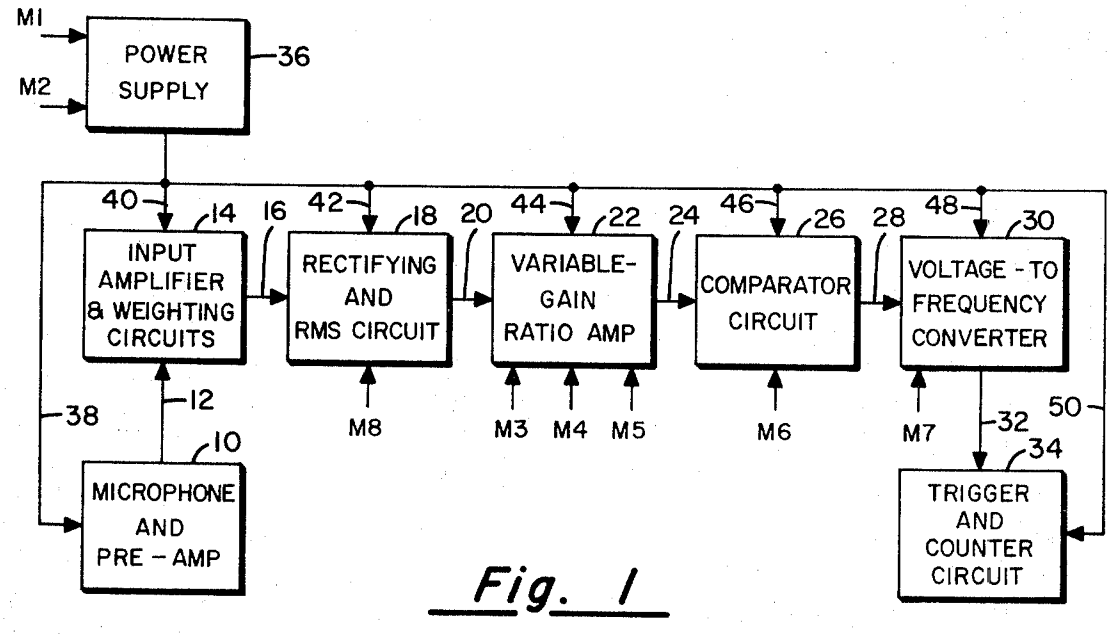
FIG. 1 is a block diagram illustrating the relation-ship of the functional circuits in the noise exposure computer.

FIG. 1 is a block diagram illustrating the relationship of the functional circuits in the noise exposure computer of this invention. There is a microphone coupled with a pre-amplifier circuit 10 for picking up sound. The microphone and pre-amplifier circuit is coupled through a cable 12 to input amplifier and weighting circuits 14, for raising the microphone output signals to useful levels. The cable 12 is arranged of sufficient length such that microphone and pre-amplifier circuits 10 can be supported in the vicinity of the ears of the wearer, while the remainder of the circuitry can be packaged to be worn on the belt, or the like. The input amplifier and weighting circuits 14 are coupled through line 16 to rectifying and RMS curcuit 18 where the input signal provided from input amplifier and weighting circuits 14 is rectified and the root mean square (RMS) of the input signal is provided on line 20 to variable-gain ratio amplifier 22. Variable gain ratio amplifier 22 is utilized to divide the permissible exposure time in half for each successive 5db range of input sound pressure. The operation of this circuit will be described in more detail below. The output from the variable-gain ratio amplifier 22 is applied on line 24 as one input to comparator circuit 26. Comparator circuit 26 functions as a threshold circuit, and prevents any sound levels detected below a predetermined threshold value to be removed from consideration in the total noise exposure calculation. Sound levels that are detected and found to exceed the predetermined threshold level result in signals on line 28 that are applied to voltage-to-frequency converter 30, where the signal received from the comparator circuit 26 is integrated, and upon the attainment of a predetermined integrated value, a count signal is emitted on line 32 to the trigger and counter circuit 34. Each count signal emitted on line 32 is representative for this embodiment of one-tenth of 1 percent of the total permissible noise exposure. Upon receipt of a count pulse on line 32, the trigger curcuit functions to advance a counter that can be visually read. Power supply 36 is utilized to provide 24 volts DC, 18 volts DC, 6 volts DC as a reference voltage, and ground for this embodiment. These voltage levels are used in various combinations for the circuits in the noise exposure computer, and power connections are illustrated diagrammatically as line 38 to the microphone and pre-amplifier circuit 10; line 40 to input amplifier and weighting circuits 14; line 42 to rectifying an RMS circuit 18; line 44 to variable-gain ratio amplifier 22; line 46 to comparator circuit 26; line 48 to voltage-to-frequency converter 30; and line 50 to trigger and counter circuit 34.

Several manual adjustments are available in the noise exposure computer. These manual adjustments are intended to be internal to the case of the noise exposure computer, and are not intended to be manually adjusted except during the calibration of the instrument. M1 is utilized to adjust one of the outputs from the power supply 36 to 18 volts DC, and M2 is utilized to adjust one of the outputs from the power supply to 6 volts DC. Manual adjustments M3, M4, and M5 are utilized in combination to adjust the variable-gain ratio amplifier 22, and their operation will be described in more detail below. Manual adjustment M6 is utilized to establish a reference voltage to the comparator circuit 26, where the voltage reference so established is indicative of the threshold noise pressure. For this embodiment M6 is adjusted to eliminate noise pressures below 90 dba. Manual adjustment M7 is another calibrating adjustment, and is utilized to adjust the current charging the integrating circuit in the voltage-to-frequency converter 30. Finally, manual adjustment M8 is utilized to calibrate the rectifying and RMS circuit 18, by adjusting the amplitude of the signal into the rectifying amplifier.

Figure 2:
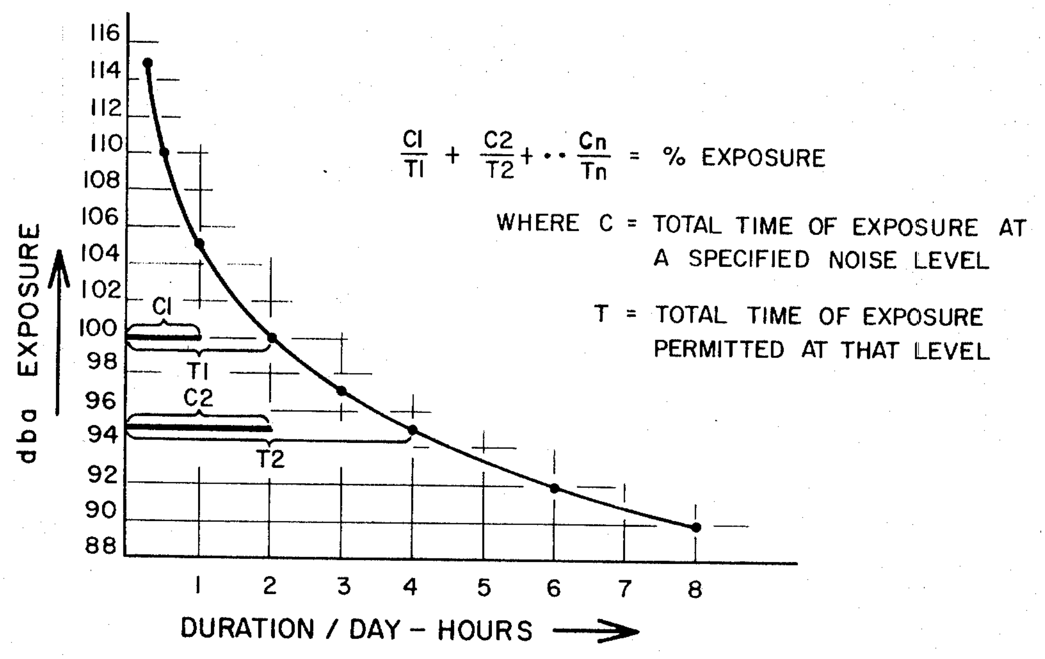
FIG. 2 is a plot of the permissible durations per day of noise exposure for increasing levels of noise exposure, as defined by the Walsh-Healy Public Contracts Act.

The United States Congress by its 1969 amendment to the Walsh-Healy Public Contracts Act has established permissible noise exposures. FIG. 2 is a plot of the permissible durations per day of noise exposure for increasing levels of noise exposure levels. This representation is a plot of increasing sound level exposure against the permissible duration of exposure to those sound levels. The legislation indicates that when daily noise exposure is composed of two or more periods of noise exposure of different levels, their combined effect must be considered, and it is insufficient to merely consider the individual effect of each. In order to determine the percentage of permissible noise exposure that has been encountered, it is necessary to calculate the sum of the fractions represented by dividing the duration of each noise level encountered by the maximum permissible duration of exposure for that noise level. This relationship can be represented by the following equation:

$$C1/T1 + C2/T2 + \ldots Cn/Tn = \%\ \text{exposure} \quad (1)$$

where $C$ equals the total time of exposure at a specified noise level, and $T$ equals the total time of exposure permitted at that level.

For purposes of example, consider that an individual is exposed for one hour ($C1$) to 100dba sound level, and that the same individual during the same 8 hour working day is also exposed to 2 hours ($C2$) of 95dba sound level. For this example, the total time ($T1$) of exposure permitted at 100dba is 2 hours, thereby resulting in a fraction of one divided by two for $C1/T1$. The total time duration ($T2$) for the 95dba pressure $C2$ is four hours, thereby resulting in the fraction 2/4 for $C2/T2$. When these are added it results in the following relationship:

$$1/2 + 2/4 = 1/2 + 1/2 = 1.0 = 100\% \quad (2)$$

For this example, it can be seen that an individual working for the 3 hours at the sound pressure levels indicated would result in 100 percent of his total permissible sound exposure, and for the remainder of the 8 hour day he would have to function in some noise level environment where the noise level at no time would exceed 90dba. Of course it is clear, that the durations of individual noise level exposures may vary, as well as the actual variations in noise levels, so that many more than two or three factors may well result in equation 1. However, the relationship must be met that when the sum of the fractions exceeds unity, the maximum permissible noise exposure has been met.

In view of the standards just described, it is readily apparent that a noise exposure must be available for wearing on the person of individuals that move about a noise-generating areas, and for those individuals that are exposed to varying levels of noise exposure.

Referring briefly to FIG. 1, it can be seen that the microphone and pre-amplifier circuitry 10, the input amplifier and weighting circuits 14, and the rectifying and RMS circuit 18 comprise the basic elements of a sound level measuring device. The American Standard Specification for general-purpose sound level meters sets forth various design considerations that are applicable to sound level meters and sound level measuring devices in order that there be consistency in treatment of sound level measuring techniques. The sound level detection portion of the noise exposure computer of this invention is arranged to substantially comply with the American Standard Specification.

As utilized herein, the sound pressure level, in decibels (db), of a sound is twenty times the logarithm to the base 10 of the ratio of the pressure of this sound to the reference pressure, with the reference pressure being 0.0002 microbar. The sound level, or noise level, in decibels, is the reading of a sound level meter designed in accordance with the American Standard Specification, with the weighting network stated. A weighting network is a circuit provided to alter the frequency response by a prescribed amount for purposes of comparison measurements.

Sound level meters in general, and the noise exposure computer in particular, include weighting networks referred to as A, B, and C.

Figure 3:
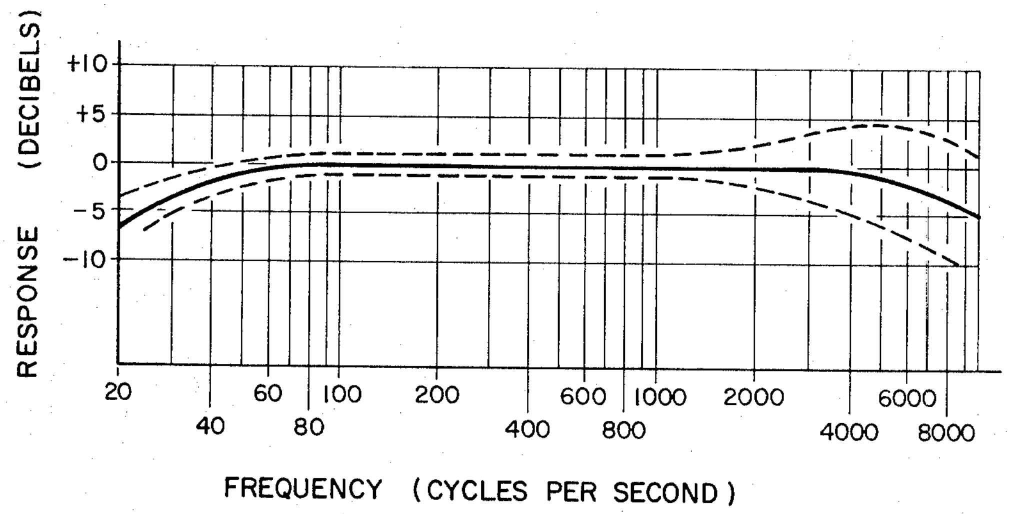
FIG. 3 is an over-all frequency response and tolerance for the C network.

The noise exposure computer, including the microphone, has a sensitivity that is relatively constant in amplitude at frequencies between 20 and 10,000 Hz, except for gradual roll-off at the extreme limitations of the frequency range. This uniform response can be considered as a "flat response," and is referred to as the C weighting network. FIG. 3 is an over-all frequency response in tolerance for the C network, and Table I sets forth the relationship of the relative response in decibels at specified frequencies, and sets forth the tolerance in decibels.

TABLE I

Over-all Response, Using the C Network, with Respect to a Flat Response

| Frequency Hz | Relative Response db | Tolerance db |
|---|---|---|
| 20 | −6.3 | +3.0,−0 |
| 25 | −4.5 | +2.0,−2.5 |
| 32 | −3.0 | +1.5,−2.0 |
| 40 | −2.0 | +1.0,−1.5 |
| 50 | −1.3 | ±1.0 |
| 63 | −0.8 | ±1.0 |
| 80 | −0.5 | ±1.0 |
| 100 | −0.3 | ±1.0 |
| 125 | −0.2 | ±1.0 |
| 160 | −0.1 | ±1.0 |
| 200 | 0 | ±1.0 |
| 250 | 0 | ±1.0 |
| 320 | 0 | ±1.0 |

| | | |
|---|---|---|
| 400 | 0 | ±1.0 |
| 500 | 0 | ±1.0 |
| 630 | 0 | ±1.0 |
| 800 | 0 | ±1.0 |
| 1,000 | 0 | ±1.5 |
| 1,250 | –0.1 | ±1.5 |
| 1,600 | –0.1 | ±2.0 |
| 2,000 | –0.2 | ±2.5 |
| 2,500 | –0.3 | ±3.5,–3.0 |
| 3,200 | –0.5 | +4.5,–3.5 |
| 4,000 | –0.8 | +5.0,–4.0 |
| 5,000 | –1.3 | +5.5,–4.5 |
| 6,300 | –2.0 | +6.0,–5.0 |
| 8,000 | –3.0 | +6.0,–6.0 |
| 10,000 | –4.3 | +6.0,–0 |

The B network changes the response with respect to the C weighting network by the amount shown in Table II, and is a simple resistor-capacitor network having its one-half power or 3-db down point below the flat (C) network response at approximately 160Hz and approaches a roll-off slope of 6db per octave at lower frequencies.

TABLE II

Over-all Response and Tolerance of A and B Weighting Networks

| frequency cps | A network response in db referred to C network | A network tolerance in db referred to C network | B network response in db referred to C network | B network tolerance in db referred to C network |
|---|---|---|---|---|
| 25 | –40.3 | ±2.0 | –16.1 | ±1.0 |
| 32 | –36.2 | ±2.0 | –14.1 | ±1.0 |
| 40 | –32.5 | ±2.0 | –12.2 | ±1.0 |
| 50 | –28.9 | ±2.0 | –10.4 | ±1.0 |
| 63 | –25.3 | ±2.0 | –8.6 | ±1.0 |
| 80 | –21.8 | ±2.0 | –6.9 | ±1.0 |
| 100 | –18.8 | ±1.5 | –5.4 | ±1.0 |
| 125 | –16.0 | ±1.5 | –4.1 | ±1.0 |
| 160 | –13.1 | ±1.5 | –2.9 | ±0.5 |
| 200 | –10.8 | ±1.5 | –2.1 | ±0.5 |
| 250 | –8.6 | ±1.5 | –1.4 | ±0.5 |
| 320 | –6.5 | ±1.0 | –0.9 | ±0.5 |
| 400 | –4.8 | ±1.0 | –0.6 | ±0.5 |
| 500 | –3.3 | ±1.0 | –0.3 | ±0.5 |
| 630 | –1.9 | ±1.0 | –0.2 | ±0.5 |
| 800 | –0.8 | ±0.5 | –0.1 | ±0.5 |
| 1,000 | 0 | ±0.5 | 0 | ±0.5 |
| 1,250 | +0.6 | ±0.5 | 0 | ±0.5 |
| 1,600 | +1.1 | ±0.5 | 0 | ±0.5 |
| 2,000 | +1.4 | ±0.5 | 0 | ±0.5 |
| 2,500 | +1.5 | ±0.5 | 0 | ±0.5 |
| 3,200 | +1.7 | ±0.5 | 0 | ±0.5 |
| 4,000 | +1.8 | ±0.5 | 0 | ±0.5 |
| 5,000 | +1.8 | ±0.5 | 0 | ±0.5 |
| 6,300 | +1.8 | ±0.5 | | ±0.5 |
| 8,000 | +1.9 | ±0.5 | | ±0.5 |

The A network changes the response with respect to that of C weighting network by the amount shown in Table II. This circuit has response of two simple cascaded identical non-insolated resistor-capacitor networks, each having its one-half power or 3db down point at 280Hz. The A weighting network approaches a roll-off slope of 12db per octave at lower frequencies.

Figure 4:
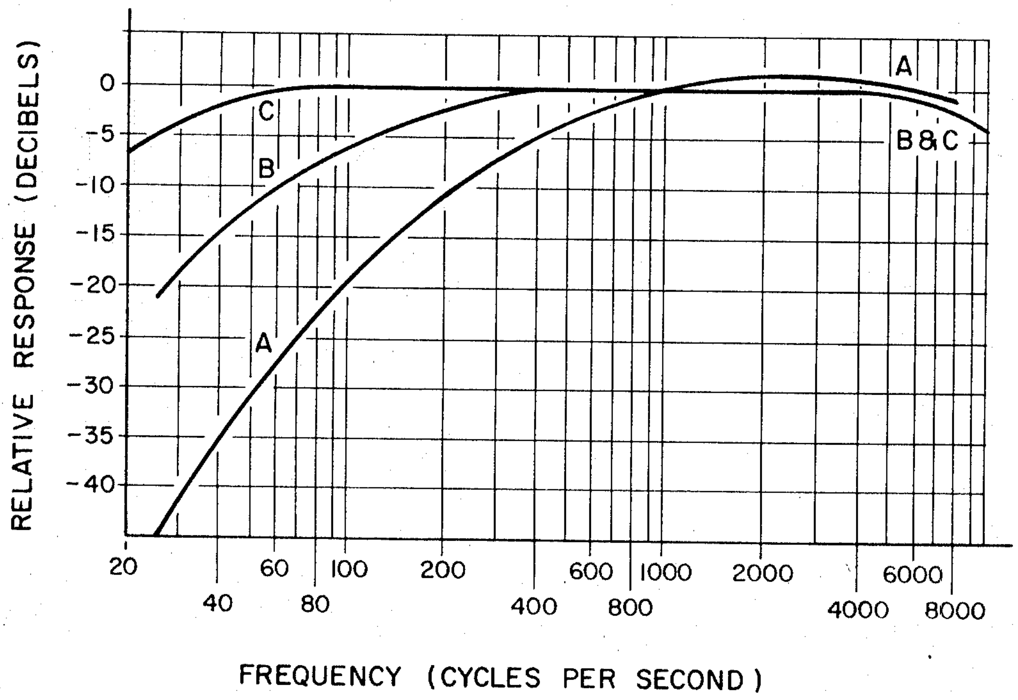
FIG. 4 is a plot of random-incidents responses for different networks.

The combined response for adding the A weighting network to the C response is plotted as the A curve in FIG. 4. Similarly, the B curve is the combined response of the B weighting network and C response.

Figure 5:
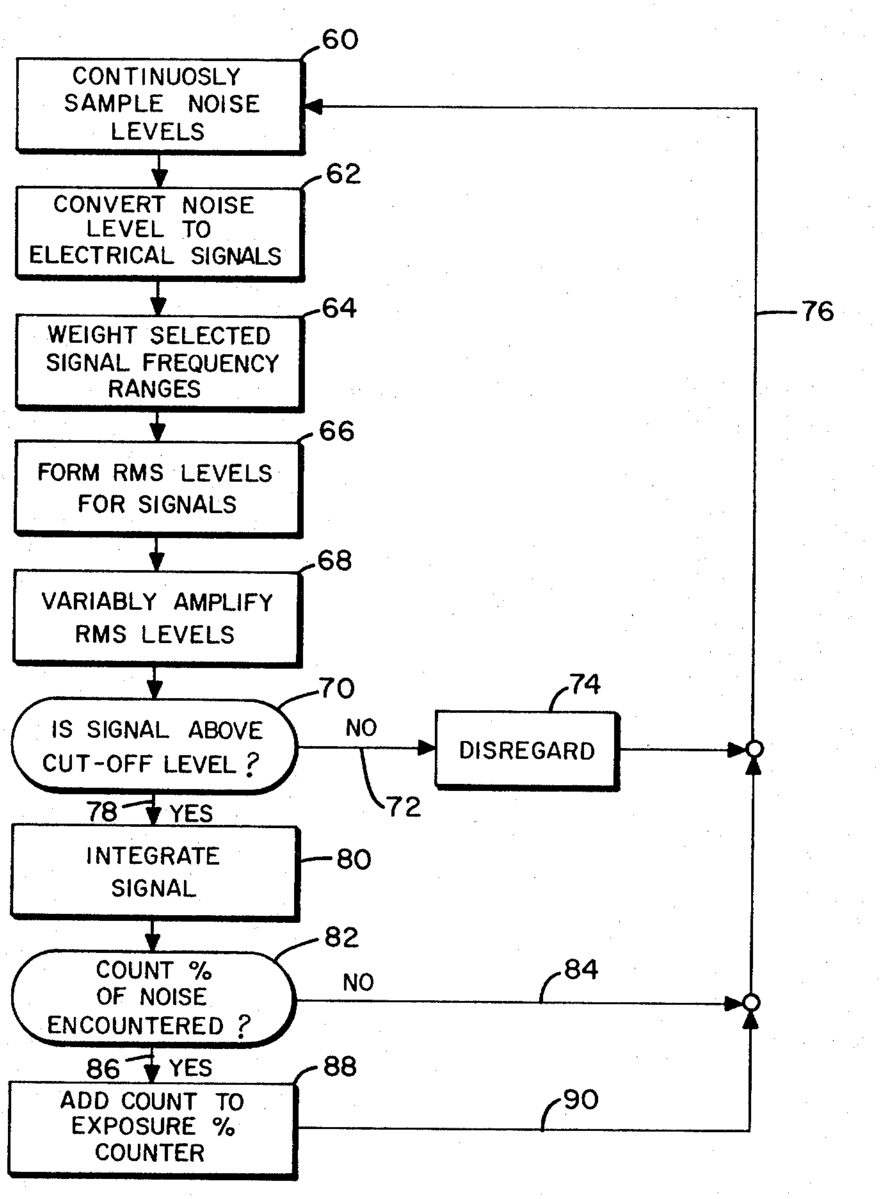
FIG. 5 is a method flow diagram of the invention.

FIG. 5 is a method flow diagram of the method of sensing noise exposure levels above a predetermined threshold, and after manipulation of the sensed signal, automatically providing a continuous summation of the fractions that are calculated by measuring the duration of the noise levels as they occur and dividing by the maximum permissible duration for the occurring noise level, for ultimately providing the continuous summation as a cumulative percentage of the permissible noise exposure. The method includes the step of continuously sampling noise levels, as shown by block 60, the sampling being accomplished by an appropriate transducer that will convert the sound level pressures into electrical signals, as illustrated in block 62. Since certain frequencies are deemed to be more harmful to the human ear than other frequencies, the method includes the step of weighting selected signal frequency ranges, as indicated in block 64, for altering their frequency response by a prescribed amount for comparison measurements. The weighted signal is rectified and the root means square (RMS) of the signal is formed, as indicated by block 66. The RMS level of the signal is essentially a DC level, and is variable amplified depending upon the RMS level, as indicated by block 68. The variability of the amplification of the RMS levels is required to establish an appropriate output signal that is indiciative of the level of the noise that has been sensed. Since the permissible duration of exposure for varying noise levels is not a straight-line function, and since 5db changes in noise levels is not equivalent to 6db changes in voltage, it is necessary that the variable amplification take place to take into account the varying differences in durations that occur as the noise level exposure increases and to cause 5db changes in noise level to result in 6db changes in voltage. The amplified RMS signal level is compared to a predetermined cut-off level, as indicated by decision element 70. In the event the amplified RMS level is below the cut-off level, the "no" line 72 will be taken and the sound level measured will be disregarded, as indicated by block 74, and path 76 will be taken to continue the sampling of the noise levels. However, in the event the RMS level is in excess of the cut-off, or threshold level, the path 78 labeled "yes" will be taken and the signal will be integrated as indicated by block 80. As the integration continues, an evaluation is continuously taking place with the decision to be made whether the count percentage of noise has been encountered, as indicated by decision element 82. In the event there is insufficient noise level to render a count, the "no" pat 84 is taken and sampling of the noise levels continue. However, in the event that the integrated signal is sufficient to warrant a percentage count, the "yes" path 86 is taken and a count is added to the percentage of permissible exposure, as indicated by block 88. Once the count has been added, path 90 is taken and the smapling of noise levels continue. While various instrumentalities can be utilized to achieve the functional steps just described, there is a novel method of computing the percentage of permissible noise exposure that has been encountered.

Figure 6:
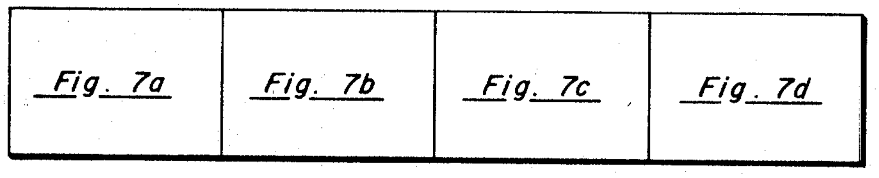
FIG. 6 is a drawing arrangement diagram.

Having previously described the working parameters that are applicable to complying with the Walsh-Healy Public Contracts Act, and having described the basic standard parameters for sound level measuring, attention will be directed to the detailed circuit diagram of the noise exposure computer of this invention. In this regard, FIG. *7a*, *7b*, *7c*, and *7d*, when arranged as illustrated in FIG. 6, are collectively a circuit diagram of the noise exposure computer. Portions of the noise exposure computer were described generally above with regard to FIG. 1, and discrete portions of the circuitry that relate to FIG. 1 will be shown enclosed in dashed blocks for ease of cross-reference between the drawings.

Figure 7A:
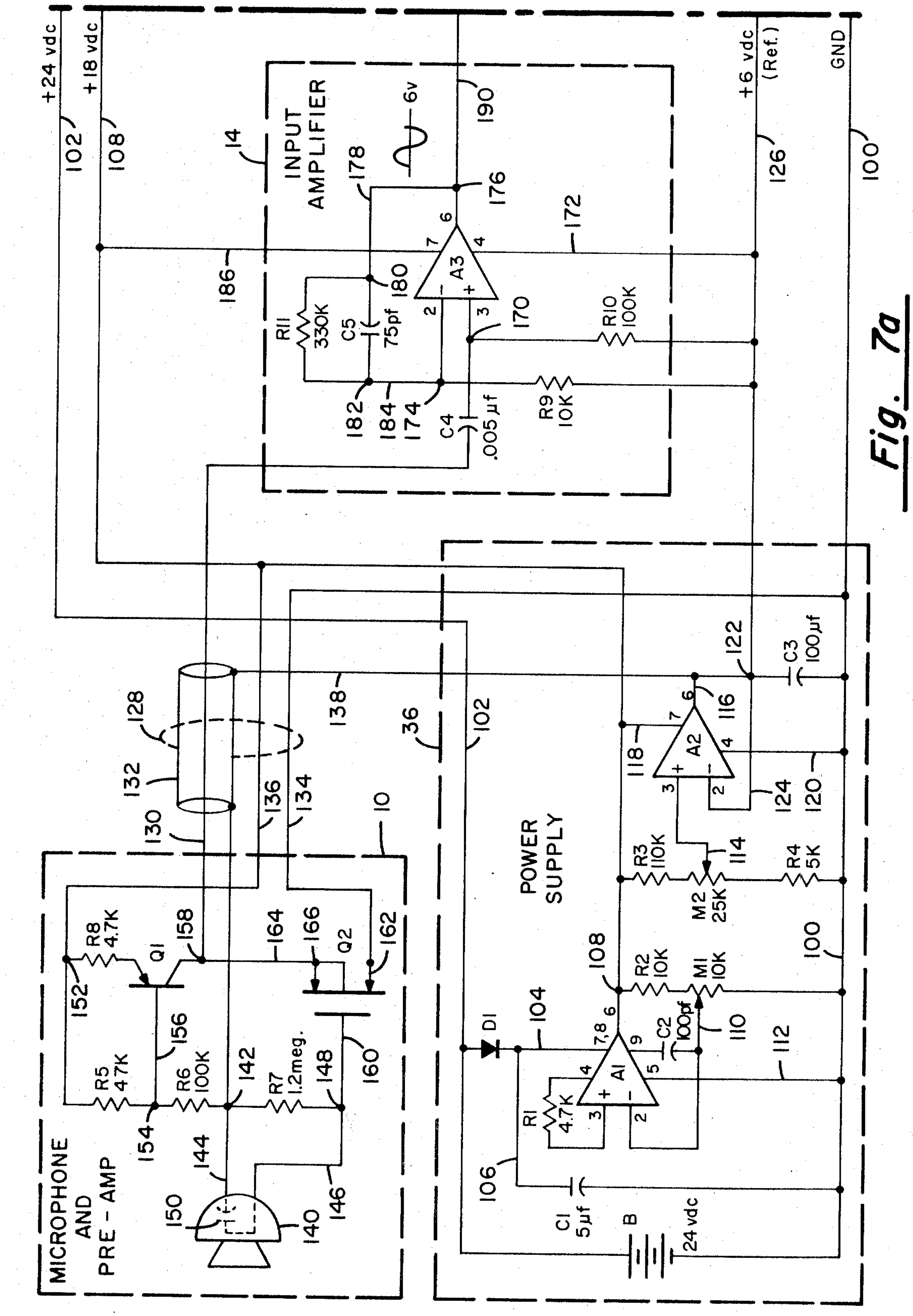
FIGS. 7*a* through 7*d*, when arranged as shown in FIG. 6, are a schemmatic diagram of the noise exposure computer of this invention.

In FIG. 7*a* the power supply is shown enclosed in dashed block 36, and includes a battery B that is characteristically capable of providing 24 volts DC having a capacity of 0.225 ampere hours. While various types of batteries can be used, it is desirable that the battery be rechargeable so that the noise exposure computer is always up to full power and is assured to be working properly. A characteristic rechargeable battery is a nickel-cadmium battery available from Gould-National Batteries, Inc., of Saint Paul, Minnesota. Line 100 is coupled to one terminal of the battery, and can be considered to be at ground potential, and line 102 is coupled to the other terminal of battery B, and will be at plus 24 volts DC. Amplifier A1 is a conventional operational-amplifier, and characteristically can be a type uA723 circuit available commercially from Fairchild, or its equivalent. A1 is a voltage regulator, and utilizes a reference voltage level and an error amplifier. A convention in this discussion with regard to all of the operational amplifiers will be that the plus input terminal is the non-inverting input, and the negative input terminal will be considered the inverting input terminal. In this arrangement, 24 volts DC is applied through diode D1 to line 104 which is coupled to pins 7 and 8 on amplifier A1. The 24 volts is also applied on wire 106 to charge capacitor C1. Since the 24 volts is coupled to an output circuit, which will be described later, capacitor C1 is available to maintain the 24 volt potential on operational amplifier A1 for the interval in which the output circuit is activated, to the extent that the voltage on lien 102 might drop below the 24 volt level. This will normally only occur at times when battery B is approaching a discharged state. In this regard, the diode D1 assures that the voltage on capacitor C1 is blocked from being applied to the output circuit, and is maintained on pin 7 and 8. Pin 4 of operational amplifier A1 is the reference voltage output pin and is coupled through resistor R1 to the non-inverting input pin 3. Output pin 6 of operational amplifier A1 is coupled to line 108, and is the 18 volt DC regulated power line. The output pin 6 of amplifier A1 is also coupled through resistor R2 and potentiometer M1 to the ground line 100. The wiper 110 of potentiometer M1 is coupled to the inverting input of operational amplifier A1. The value of R1 approximates the parallel resistence value of the portion of M1 between the wiper and ground, and the value of R2 plus the portion of M1 between its wiper and the terminal that is coupled to resistor R2. The adjustment of the wiper 110 operates to finely adjust the resistance levels, and adjust the inputs to the inverting and non-inverting input terminals in such a manner that the voltage on line 108 is maintained at 18 volts DC. Capacitor C2 is coupled between pin 9 of the amplifier A1, and the line 110 and is provided to prevent oscillation of operational amplifier A1. Pin 5 of amplifier A1 is coupled through wire 112 to ground.

The 18 volt supply is coupled to a divider network comprised of resistor R3, potentiometer M2, and resistor R4 which are coupled in series between ground line 100 and the 18 volt supply line 108. The wiper 114 of M2 is coupled to the non-in-inverting inputs of operational amplifier A2. In this embodiment, operational amplifier A2 can be a type uA741 circuit available commercially from Fairchild, or its equivalent. In the configuration shown, operational amplifier A2 is designed to be essentially a unity-gain amplifier, and is to provide a plus 6 volt DC regulated voltage level at its output pin 6, which in turn is coupled to line 116. The 18 volt DC is applied on line 118 to pin 7 of amplifier A2, and pin 4 of A2 is coupled through wire 120 to ground 100. The output line 116 is coupled to junction 122, with wire 124 being coupled between junction 122 and the inverting input to amplifier A2. For this arrangement, it can be seen that the adjustment of potentiometer M2 will be such that the plus 6 volt level in the divider will be finely adjusted for application to the non-inverting input pin, and that the output from amplifier A2 will be the regulated plus 6 volt level, which in turn will be applied to the inverting input for maintaining the output at a regulated level. Capacitor C3 is coupled between junction 122 and ground line 100, and provides filtering. The regulated plus 6 volt line that is coupled to junction 122 will be referred to as line 126, and will function as a reference level throughout the remainder of the circuitry.

A four wire microphone cable shown enclosed within dashed line 128 includes a signal line 130 that is encased within shield 132, a ground line 144 and a power line 136. The ground line 134 is coupled to ground cable 100. The plus 6 volts DC reference is coupled through wire 138 to the shield 132.

The microphone and the pre-amplifier circuitry is shown enclosed in dashed block 10. The microphone 140 is a commercially available microphone, and one that has found advantageous use in this circuit configuration is the model 99A401 available from Shure Brothers, Inc., having an output equal 1 volt and having a parameter of one microbar pressure 59.5db below 1 volt per microbar at 400Hz. The 6 volt DC reference applied to the shield 132 of the microphone cable is coupled to junction 142, and is a reference for the circuit. Line 144 couples junction 142 to one terminal of the microphone, and line 146 couples the other terminal of the microphone to juncture 148. Resistor R7 is coupled between junctions 142 and 148. The capacitance in the microphone is shown in dashed line 150, and this capacitance in conjunction with the resistence R7 functions as a high-pass filter having a characteristic of 3db down at 280 Hz, and forms a portion of the weighting network.

The 18 volt supply carried on line 136 is applied to junction 152, with resistor R5 coupling junction 152 to junction 154. The base of transistor Q1 is coupled by wire 156 to junction 154. Resistor R6 couples junction 154 to junction 142. The emitter of transistor Q1 is coupled through resistor R8 to junction 152. The collector of transistor Q1 is coupled to junction 158.

In this embodiment transistor Q2 is a P channel enhancement mode MOS field-effect transistor, and is utilized for providing essentially a unity-gain for converting a relatively high input impedance to a low output impedance for driving the microphone cable 128. The arrangement is such that line 160 couples junction 148 to the gate of transistor Q2, and ground potential is applied through line 134 to the drain 162. Line 164 couples junction 158 to the source connection 166.

In operation, then, signals received by microphone 140 are applied over wire 146 to the gate-connection line 160, for controlling the operation of transistor Q2. The signal in turn is provided to line 164 and through junction 158 to the signal line 130. Transistor Q1 is biased such that it provides a constant-current source for the operation of transistor Q2, and the resultant circuit operation is to convert the high input impedance to the low input impedance required for driving the signal line 130.

The input amplifier is shown enclosed in dashed block 14, and utilizes an operational amplifier A3. For this embodiment, an operational amplifier identified as uA741, available from Fairchild, or its equivalent, can be utilized. The signal available from the microphone and pre-amplifier circuitry can, as partially weighted by these components, is applied through signal line 130 and is coupled through capacitor C4 to junction 170, with junction 170 being coupled to the non-inverting input terminal 3 of operational amplifier A3. Resistor R10 is coupled between junction 170 and the plus 6 volt reference line 126 for supplying a 6 volt reference level to the signal output. Pin 4 of amplifier A3 is coupled through wire 172 to plus 6 volts DC. The inverting input terminal 2 of operational amplifier A3 is coupled to junction 174, with resistor R9 coupled intermediate junction 174 and 6 volt reference line 126. Output terminal 6 of amplifier A3 is coupled to junction 176, with line 178 coupled to the junction 180 of resistor R11 and capacitor C5. The other terminals of resistor R11 and capacitor C5 are coupled to junction 182, with this junction being coupled through wire 184 to junction 174. Line 186 couples 18 volt line 108 to pin 7 of amplifier A3.

In this configuration, the combination of capacitor C5 and resistor R11 in the feedback circuit functions as a high-frequency attenuator, and has a characteristic of approximately 3db down at 8kHz. The combination of capacitor C4 and resistor R10 is that of a high-pass filter, having a characteristic of approximately 3db down at 280Hz. These two filtering networks also are part of the A weighting circuitry.

Functionally, then, input amplifier 14 operates as a non-inverting amplifier having a gain of approximately 11 for this embodiment, and provides an output signal on line 190 from junction 176 that is reference at a pulse 6 volts DC level, where the signal has been weighted in accordance with the requirements of FIG. 4.

Figure 7B:
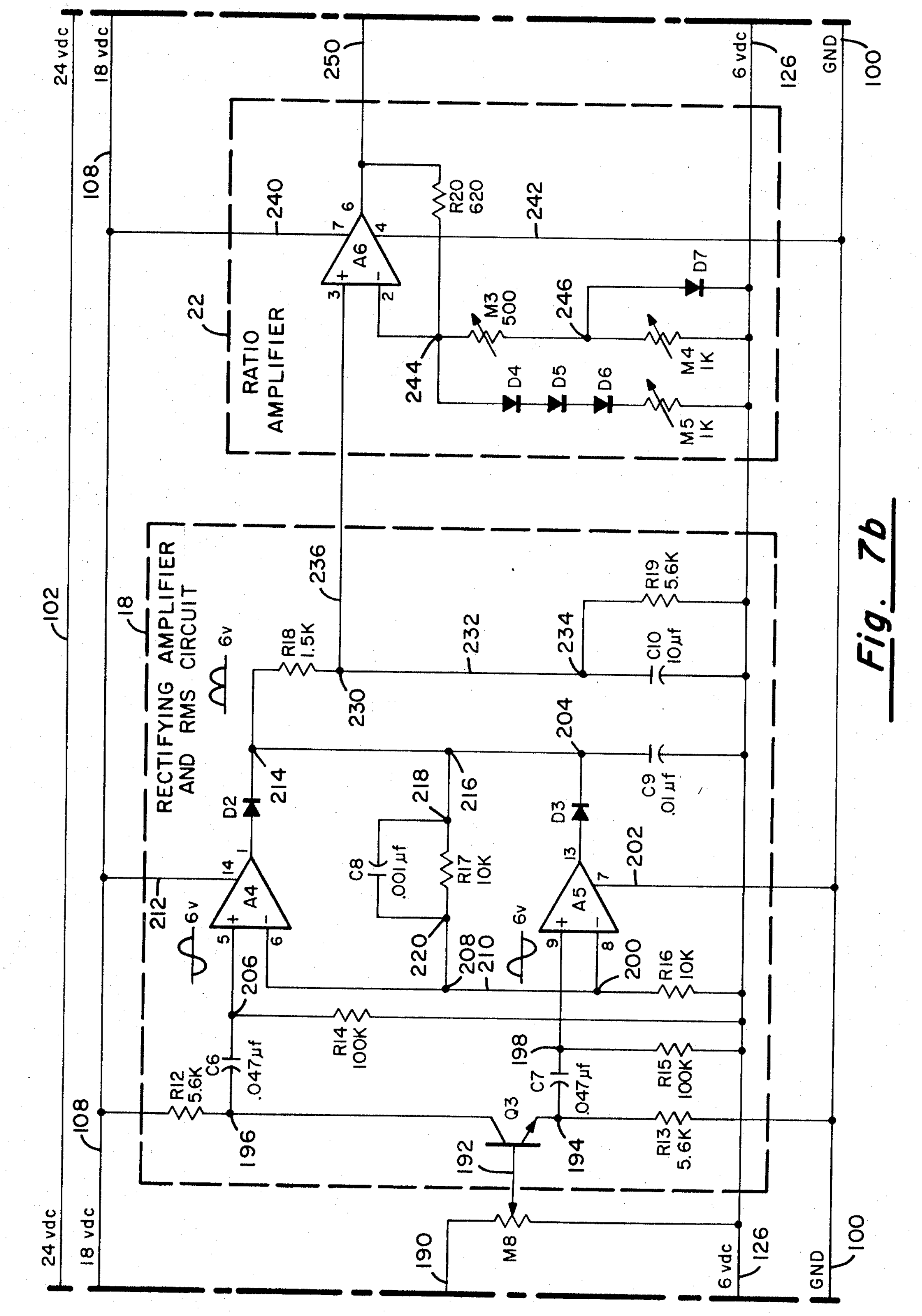

In FIG. 7*b* the rectifying amplifier and RMS circuit is shown enclosed within dashed block 18. The amplified and weighted input signal is applied on line 190 to potentiometer M8, which has its other terminal coupled to the 6 volt reference line 126. The wiper 192 of M8 is coupled to the base of transistor Q3. The emitter of transistor Q3 is coupled to junction 194, and the collector of transistor Q3 is coupled to junction 196. Junctions 194 and 196 function to provide the in-phase signal and the 180 degree phase-shifted signal, respectively. Junction 194 is coupled through resistor R13 to ground 100, and junction 196 is coupled through resistor R12 to 18 volt line 108. Operational amplifiers A4 and A5 are symmetrical, and for this embodiment, each can be one-half of the circuitry on an integrated circuit designated uA739C, available from Fairchild, or the equivalent. Junction 194 is coupled through capacitor C7 to junction 198, which in turn is coupled to the non-inverting input pin 9 of amplifier A5. Junction 198 is also coupled through resistor R15 to 6 volt reference line 126. The inverting input pin 8 of amplifier A5 is coupled to junction 200, with resistor R16 coupling junction 200 to 6 volt line 126. Pin 7 of amplifier A5 is coupled through wire 202 to ground line 100, and the output pin 13 is coupled through diode D3 to junction 204.

Junction 196 is coupled through capacitor C6 to junction 206, which in turn is coupled to non-inverting input pin 5 of amplifier A4. Junction 206 is also coupled through resistor R14 to 6 volt line 126. The inverting input pin 6 of amplifier A4 is coupled to junction 208, which in turn is coupled through wire 210 to junction 200, and through resistor R16 to 6 volt DC, as previously described. Pin 14 on amplifier A4 is coupled through wire 212 to 18 volt line 108. The output pin 1 of amplifier A4 is coupled through diode D2 to junction 214. Junctions 204 and 214 are coupled to junction 216 which in turn is coupled to junction 218. Junction 208 is coupled to junction 220, with resistor R17 being coupled between junctions 218 and 220, and capacitor C8 coupled across junctions 218 and 220. Capacitor C9 is coupled between junction 214 and 6 volt line 126.

In operation, the signals derived at junctions 198 and 206, through the operation of transistor Q3 and its associated circuitry, results in the weighted and amplified signal being applied in phase to non-inverting input pin 9 of operations amplifier A5. The amplified and weighted signal shifted 180 degress out of phase from input is applied to the non-inverting input pin 5 of amplifier A4. With the entire circuit referenced at 6 volts, and with the orientation of diodes D2 and D3 to pass only signals that are more positive then 6 volts, there will appear at junctions 204 and 214 positive going signals on alternative half-cycles, resulting in a rectified output.

Capacitors C8 and C9 are utilized to prevent oscillation of the amplifiers A4 and A5.

Resistor R18 is coupled across junction 214 and junction 230, with line 232 coupling junction 230 to junction 234. Capacitor C10 is coupled between junction 234 and 6 volt line 126, and resistor R19 is coupled between junction 234 and 6 volt line 126. The combination of resistors R18 and R19 and capacitor C10 as arranged, results in the RMS value of the rectified signal being applied as essentially a DC voltage on line 236.

The circuitry described in detail to this point is, essentially a sound level measuring device, and is designed to comply with standards established for sound level meters.

The variable-gain ratio amplifier is shown enclosed within dashed block 22. An operational amplifier A6, which can be a type uA741 integrated circuit, or its equivalent, is arranged with its non-inverting input terminal 3 coupled to line 236 for receiving the RMS voltage level from the rectifying amplifier and RMS circuit 18. Line 240 couples pin 7 of the amplifier to 18 volt line 108, and line 242 couples pin 4 to ground line 100. The inverting input pin 2 of amplifier A6 is coupled to junction 244, with the output pin 6 being coupled through resistor R20 to junction 244. Junction 244 is coupled through cascaded diodes D4, D5, and D6 and through variable resistor M5 to the 6 volt reference line 126. Variable resistor M3 is coupled between junction 244 and junction 246, with variable resistor M4 coupled between junction 246 and the 6 volt reference line 126. Diode D7 is coupled between junction 246 and the 6 volt reference line 126, and for this embodiment is a germanium diode having a characteristic germanium diode switching curve.

In this configuration, the gain of variable-gain ratio amplifier 22 is approximated by the following relationship:

$$G = 1 + (R20/RB) \tag{3}$$

In the foregoing relationship, $R20$ is the value of resistor R20, and $RB$ is the combined variable resistive value of diodes D4, D5, D6, and D7 as they switch toward conduction, and the variable resistors M3, M4, and M5. After adjustment of the circuit, which will be described below, as the input voltage on line 236 increases, the germanium diode D7 will start to conduct following its characteristic switching curve and providing a variable voltage drop. As the voltage continues to increase. diodes D4, D5, and D6 will start to conduct. As the diode combinations move along their characteristic switching curves in conduction, the net effect is a reduction of the RB quantity in Equation 3, thereby resulting in a variable increase in the gain of the variable-gain ratio amplifier 22.

The components are selected and the amplifier is so designed that a 5db change in input voltage will product approximately a 6db change in output voltage. A 5db change in input noise pressure, as indicated by a 5db change in input voltage, is such that the time will be divided in half for each subsequent 5db change.

The characteristic operation of this embodiment is summarized in Table III for a range of input levels representative of 90db through 115db, and it can be seen that a count period is divided in half for each successively increasing 5db level change.

TABLE III

| Level db | Gain count | Period (seconds) | Input Voltage | Output Voltage |
|---|---|---|---|---|
| 90 | 1.78 | 28.8 | 0.169 | 0.300 |
| 95 | 2.00 | 14.4 | 0.300 | 0.600 |
| 100 | 2.25 | 7.2 | 0.533 | 1.200 |
| 105 | 2.53 | 3.6 | 0.950 | 2.400 |
| 110 | 2.84 | 1.8 | 1.690 | 4.800 |
| 115 | 3.20 | 0.9 | 3.000 | 9.600 |

The calibration of the variable-gain ratio amplifier 22 is an important part of the calibration of the noise exposure computer, and requires the adjustment of manually adjustable resistors M3, M4, and M5 in order to provide the appropriate amplification of operational amplifier A6 so that signal levels applied on output line 250 are at calibrated levels. In order to calibrate this circuit, a voltage level of 0.950 volts, which is representative of a 105db noise level input, is applied to line 236 from an external source, and manual adjustment M3 is adjusted until such time as the voltage read on line 250 is equal to 2.400 volts. Having made this adjustment, a voltage level of 0.169 volts, which is representative of a 90dba noise level is applied on line 236 to operational amplifier A6, and M4 is adjusted until the voltage read on line 250 is substantially equal to 0.300 volts. For the higher noise levels, it is necessary to utilize the adjustment of M5. In this regard, to calibrate, a 3.000 volt supply is applied to line 236, and M5 is adjusted until the voltage read on line 250 is equal to 9.600 volts. Having made these adjustments, the ranges set forth in Table III should again each be checked with minor fine adjustments to resistors M3, M4, and M5 resulting in the calibration of the variable-gain ratio amplifier 22.

Figure 7C:
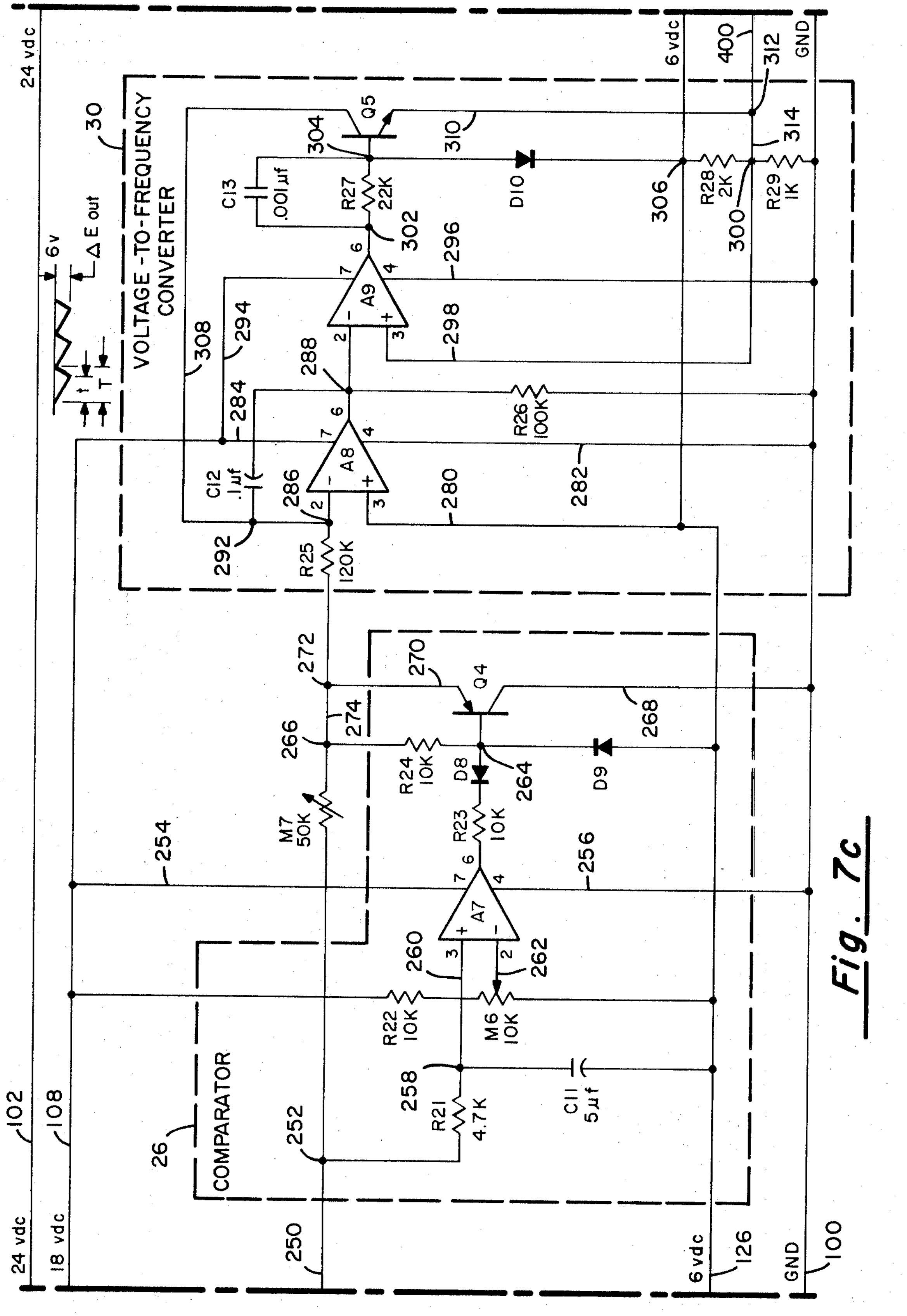

In FIG. 7c the comparator circuit is shown enclosed within dashed block 26. The output signal from the variable-gain ratio amplifier 22 is applied on line 250 to junction 252. Operational amplifier A7, which can be a uA741 or its equivalent, is operated without feedback. In this operation, pin 7 is coupled through wire 254 to 18 volt line 108, and pin 4 is coupled to ground line 100 through line 256. Resistor R21 is coupled between junction 252 and junction 258, with junction 258 being coupled through wire 260 to non-inverting input 3 of amplifier A7. Capacitor C11 is coupled between junction 258 and the 6 volt reference level line 126. Resistor R22 and manual adjustment M6 are coupled in series between 18 volt line 108 and 6 volts reference line 126. The wiper contact 262 of M6 is coupled to the inverting input pin 2 of amplifier A7. Output pin 6 of amplifier A7 is coupled in series through resistor R23 and diode D8 to function 264. Variable resistor M7 is coupled between junction 252 and junction 266, with resistor R24 being coupled between junction 264 and junction 266. Diode D9 is coupled between junction 264 and 6 volt reference level line 126. Transistor Q4 has its base connected to junction 264, and has its collector coupled through wire 268 to ground line 100. The emitter of Q4 is coupled through wire 270 to junction 272, with wire 274 connecting junctions 266 and 272.

After calibrating the comparator 26, by adjusting M6 so that approximately 0.3 volt is applied as a reference voltage to operational amplifier A7, the circuit will operate to discriminate between noise levels that are above 90dba and below 90dba. The 0.3 volt reference level for this embodiment is representative of a base noise threshold level of 90dba. Since operational amplifier A7 has no feedback, a voltage more positive than 0.3 volts on the non-inverting input pin 3 will result in the output voltage at pin 6 going positive. As the output voltage goes positive, the base of transistor Q4 is biased more positive than the emitter, and transistor Q4 is non-conducting. When transistor Q4 is non-conducting it is substantially ineffective to interrupt the current flow at junction 272 and the signal will not be interrupted. When the signal applied on line 250 is such that a voltage level below approximately 0.3 volts is applied to non-inverting input pin 3, output terminal 6 of operational amplifier A7 is driven negative, thereby biasing the base of transistor Q4 in a negative direction and switching it into conductive saturation. By switching transistor Q4 to a conductive state to saturation, the current flow at junction 272 is completely diverted through transistor Q4 and no integration takes place. Diode D9 acts as a clamping diode, and prevents the base of transistor Q4 from being driven slow the 6 volt reference. The adjustment of M6 for a voltage level indicative of 90dba has a reference level is purely arbitrary, and various adjustments to resistor M6 would allow either higher or lower noise levels to be considered as the threshold value.

The voltage-to-frequency converter circuit is shown enclosed in dashed block 30. This circuit utilizes two operational amplifiers referred to as operational amplifiers A8 and operational amplifier A9. For this embodiment, these operational amplifiers can also be of the type uA741, or its equivalent. In this configuration, the no N-inverting input pin 3 of amplifier A8 is coupled through wire 280 to 6 volt reference line 126. Pin 4 of amplifier A8 is coupled through wire 282 to ground line 100. Pin 7 of amplifier A8 is coupled to positive 18 volt line 108 through wire 284. Junction 272 is coupled through resistor R25 to junction 286, with inverting input terminal 2 of amplifier A8 also coupled to junction 286. Output terminal 6 of amplifier A8 is coupled to junction 288, and junction 286 is coupled through wire 290 to junction 292. Capacitor C12 is coupled between junctions 288 and 292. Resistor R26 is coupled between junction 288 and ground line 100, with junction 288 also being coupled to the inverting input pin 2 of operational amplifier A9. Power is provided to operational amplifier A9 by wire 294 coupling 18 volt line 108 to pin 7, and pin 4 of amplifier A9 is coupled through wire 296 to ground line 100. The non-inverting input terminal 3 of amplifier A9 is coupled through wire 298 to juncton 300. Output terminal 6 of amplifier A9 is coupled to junction 302, with resistor R27 being coupled to junction 302 and junction 304. Capacitor C13 is coupled across junctions 302 and 304, with the base of transistor Q5 being coupled to junction 304. Diode D10 is coupled between junction 304 and junction 306, the latter junction being the 6 volt reference line 126. Resistor R28 is coupled between junction 306 and junction 300, and resistor R29 is coupled between junction 300 and the ground line 100. The collector of transitor Q5 is coupled by wire 308 to junction 292, and the emitter of transistor Q5 is coupled through wire 310 to the junction 312, with wire 314 coupling junction 312 to junction 300.

It can generally be seen that the voltage-to-frequency converter 30 is comprised of an integrator utilizing R27, M7 and C12 with operational amplifier A8, a voltage comparator in the form of operational amplifier A9, and a switch in the form of transistor Q5, these circuits taken with their associated biasing and control connections. The effective output voltage of the integrator is at junction 288, and is a negative-going ramp which falls at a rate directly purportional to the DC input signal. When the output of the integrator reaches a predetermined negative level, it is sensed by the comparator operation of operational amplifier A9, which in turn functions to drive the switch Q5 to reset the integrator capacitor C12 and output 288 to reference. This cycle is then repeated. The time required for the integrator output to go from the reference voltage, to the preset level is inversely purportional to the input voltage, therefore the operating frequency will be purportional to this voltage.

This portion of the noise exposure computer must also be calibrated, and utilizes manually adjustable resistor M7 for this calibration. To perform this calibration, a 3.00 volt signal is applied on line 236 as an input to operational amplifier A6, and the output voltage on line 250 is measured to assure that it is approximately 9.60 volts. With these conditions present, resistor M7 is adjusted until the readout counter (to be described in more detail below) provides one count every 900 milliseconds. It is the function of M7 to adjust the current flow for charging the integrating capacitor C12.

The voltage comparator circuitry is utilized at the output of the integrator circuitry. A threshold voltage is applied to the non-inverting input pin 3 of amplifier A9 of the compartor from the resistive divider comprised of resitors R28 and R29, in this case approximately 2 volts. when the output voltage of the integraotr goes below the reference voltage, the output of the comparator rises rapidly turning on transitor Q5, which in turn supplies positive feedback to the non-inverting input pin 3 of amplifier A9. Transistor Q5 conducts to saturation and drives current into the summing node of the integrator circuit, and it also holds the non-inverting input 3 of amplifier A9 at or very near to reference potential. When the integrator output, which is being driven positive by the switch current, reaches the reference level, the comparator output swings negative and turns off transistor Q5. The cycle is then repeated. Resistor R27 limits the base drive on transistor Q5 while capacitor C13 decreases the turn-on and turn-off time of transistor Q5.

The time $t$ required for a given change in the output voltage of the integrator is given in terms of the input voltage applied at junction 252 and the circuit values by the following relationship:

$$t = (R25 + M7)\ (C12)\ (\Delta E/Ein) \qquad (4)$$

For this embodiment, a 90dba exposure time is 8 hours of permissible exposure. If it is desired to represent the output as 1,000 units, or each unit representing one-tenth of one precent (1%) of the total permissible exposure, the following relationship can be calculated:

$$\text{Time/count} = \frac{8\text{ hrs.} \times 60\text{ min./hr.} \times 60\text{ sec./min.}}{1000 \times 128\text{ counts}} = 0.225\text{ seconds/count} \qquad \text{(Equation 5)}$$

in the foregoing relationship, for strictly mathematical considerations there would only be a devisor of 1,000, but in order to attain reasonable and more accurate integration operation, it has been deemed desirable to increase the number of counts to 128,000 within the voltage-to-frequency converter 30, and to divide the resulting pulse stream by 128 to yield the total of 1000 counts, as will be described in more detail below, before applying the pulse train to the counter. Of course the same calculations can be carried forward for each noise exposure level, as reflected in FIG. 2, with the corresponding count interval being respectively shorter for each of the increasing levels of noise exposure.

Figure 7D:
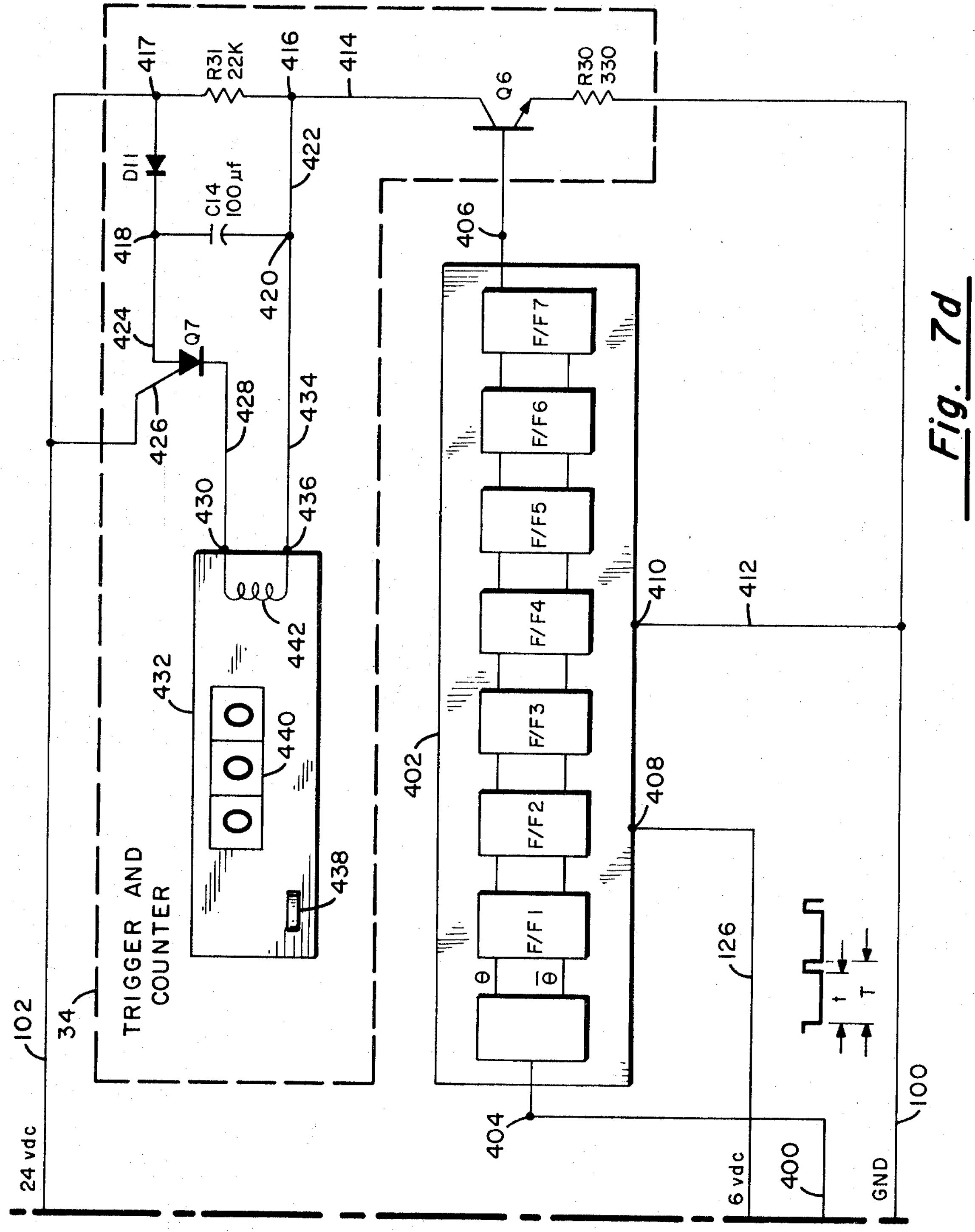

The pulse train output from junction 312 on line 400 is 128 times greater than is desired to drive the visual counter, as has been just described. This pulse train is applied as an input to a standard flip-flop counter 402, as shown in FIG. 7*d*. This counter 402 can be selected as a seven-stage binary counter of a type well-known in the art. A circuit that has been found particularly advantageous from a consideration of size and power requirement is available from RCS commerically, and is identified as a monolythic silicon seven-stage counter having a part number of CD400E. Basiclaly, counter 402 has an input terminal 404 coupled to line 400 for receiving the input pulses. As the chain of input pulses are applied, the count is caused to propagate through a series of seven flip-flops in a manner such that it requires 128 input pulses to result in an output pulse at output terminal 406. The counter 404 is powered by a connection at terminal 408 to 6 volts DC on line 126, and by a connction to terminal 410 through wire 412 to ground potential on line 100. The operation of this type of flip-flop countr is well-known in the art, and its internal operation need not be described. In the event that other time division periods are desired, the input pulse train can be divided by connection to the output from the various flip-flop stages. For example, two divided by 2, a connection would be made to the output of flip-flop 1; to divide by 4, a connection would be made to the output of flip-flop 2; to divide by 8, a connection would be made to the output of flip-flop 3; to divide by 16, a connection would be made to the output of flip-flop 4; to divide by 32, a connection would be made to the output of flip-flop 5; and to divide by 64, a connection would be made to the output of flip-flop 6. It is clear that this is a binary progression and it is not deemed that any further discussion be necessary.

The trigger and counter circuit is shown enclosed in dashed block 34 on FIG. 7*d*. The base of transistor Q6 is coupled to output terminal 406 of counter 402. The emitter of transistor Q6 is coupled through transistor R30 to ground line 100, and the collector of transistor Q6 is coupled through wire 414 to junction 416. Resistor R31 has one terminal coupled to junction 416 and its other terminal coupled to junction 417, with one terminal of diode D11 coupled to 417 and the other terminal of diode D11 being coupled to junction 418. Junction 417 is also coupled to 24 volt line 102. Capacitor C14 is coupled between junction 418 and 420, with junction 420 being coupled by wire 422 to junction 416. Transistor Q7 is a programmable unijunction transistor available commercially. A programmable unijunction transistor that has been found to be acceptable in this embodiment is available from General Electric commercially, and is identified by part numbr D13T1. This transistor, or its equivalent, can be utilized. Wire 424 couples the anode of transistor Q7 to junction 418, and the anode gate 426 is coupled to 24 volt line 102. The cathode is coupled throuh wire 428 to one input terminal 430 of a counter 432. Wire 434 couples junction 420 to the other input terminal 436 of counter-432. Counter 432 can be a electro-magnetic counter that is available commerially from the Hecon Corporation and identified as part number S855/F856, or its equivalent. The counter 432 has a push button 438 to reset the numerals on the dial 440 to an all-zero condition. Three digit positions are available, and when applying 1,000 pulses will result in the right-most digit position displaying tenths of 1 percent of noise exposure, and the left-most and center digit positions displaying the tens, and units positions, respectively, of detected noise exposure.

The counter 432 includes a counter coil 442, which is coupled across input terminals 430 and 436.

The output from divider 402 is a variable duration square wave having a voltage swing from approximately 0 volts to approximately 6 volts. When the output voltage at output terminal 406 is at 0 volts, transistor RQ6 is biased to a non-conducting state. When terminal 406 is switched to the higher level, transistor Q6 is switched to a conducting state, and a current path is established allowing the charge to be established on capacitor C14. Taking into acount the voltage drop across the transistor Q6, and the components in the charging path, the voltage established on capacitor C14 is in the order of approximately 20 volts. The level of charge on cpaacitor C14 is applied through concuctor 424 to the anode of the programmable unijunction transistor Q7. With transistor Q6 conducting, there is a current path to ground and the 24 volt DC level available on line 102 is applied to the gate 426 of transistor Q7. With this biasing arrangement, transistor Q7 will not conduct since its anode is less positive than its gate. When the output of counter 402 switches, and turns transistor Q6 to a non-conducting state, the current path to ground is removed and the bias level on gate 426 is caused to be essentially floating. Under this operational condition , the anode-gate function is forward biased by the voltage on capacitor C14 and Q7 is gatedon. Capacitor C14 discharges through the anode and cathode of transistor Q7 and through the counter coil 442. The discharge of capacitor c14 results in a pulse in coil 442 that causes the count in the percentage counte 432 to advance one count. Once capacitor C14 has discharged, it remains in a relaxed state until such time as trigger transistor Q6 is caused to again conduct. Thereby establishing the current path to ground and again causing the capacitor C14 to charge. The circuit arrangement is such that even though the output voltage level at terminal 406 remains positive for a relatively long period of time for low sensed incident noise levels, capacitor C14 will only be charged to its appropriate level, and the counter 432 will not be switched until such time as the count duration has been fully completed as indicated by a change in the output level at terminal 406 that casues Q6 to turn off.

While the coutner 432 is an electro-mechanical type counter for this embodiment, it is plain that the counter could be replaced by well-known counting tubes, or lighted indicator circuits that are well-known in the art, without departing from the scope and spirit of the invention.

As was mentioned above, diode D1 in FIG. 7a, together with capacitor C1 are utilized to protect amplifier A1 during a count cycle of the trigger and counter 34. Capacitor C1 will be charged approximately to the level of battery B, and diode D1 is so arranged that should battery B lose sufficient of its charge so that the action of the trigger and counter circuit will cause a fluctuation on line 102, the voltage on capacitor C1 will maintain amplifier A1 in a steady operational state, with any discharge to line 102 being inhibited by diode D1.

In the event that it is desired to prevent the wearer from having access to the clear pin 438 of the electromechanical counter 432, it can either be assembled inside of the casing, or it can be provided with a locked seal that can only be opened by supervisory personnel, and the like.

Various options are available in the utilization of the noise exposure computer of this invention One of these options that may be desirable for certain applications, is to eliminate the use of the trigger and counter circuit 34, and to replace it with a transmitting circuit that is capable of transmitting a recognizable signal to a central receiving station where the noise expsoure is automatically monitored. Transmitters of this type are available, and could utilize a unique modulated signal, a coded pulse train, or the like. For such an arrangement, it is only necessary that each noise exposure computer have a discrete and distinguishable signal, so that the monitoring station can identify which of the signals are being received for up dating the appropriate count. A system of this natue would have utility where many individuals are working in a factory area, or the like, where the movement of the individuals is relatively limited. A disadvantage would occur in this system, for those situations where the individual wearer would be shielded from the monitoring station. An advantage to this type of system, however, would be in that the monitoring station could provide a permanent record by way of punched card, punched paper tape, typewriter print-out, or magnetic tape record, or the like, of the noise expsoure of each employee, so that proof of compliance with legal requirements, or the lack of such compliance, would automatically be provided.

Yet another option in the noise exposure computer is to provide an external connection in line 236 in FIG. 7*b*, with such external connection being available to connect to recording apparatus, or the like. Recording of signals received at this point would provide a profile of the noise levels encountered by the noise level measuring portion of the noise exposure computer. Such a recording would provide a history of information of noise level occurrence that would be correlated to employee location, time of occurrence, frequency of occurrence, or the like. Of course, sound level analyzers can also be used to analyze the signals appearing at this point.

CONCLUSION

In conclusion, then, it can be seen that the various stated general and detailed objectives of the invention have been achieved. A fully automatic instrument that can be worn on the person for at any given time providng a precise determination of the person's cumultive noise expsoure as a percentage of permissible noise exposure has been described. The noise exposire computer that has been described is fully atuomatic to provide a continuous summation of the fractions that are calculated by measuring the duration of the noise levels as they occur and dividing by the maximum permissible duration for the occurring noise levels and displayng the continuous summation as a visually readable cumulative percentage of the permissible noise exposure. A novel and improved method for sensing noise exposure levels above a predetermined threshold and automatically providing a continuous summation of the fractions that are calculated by measuring the duration of the noise levels as they occur divided by the maximum permissible duration for that occurring noise level, and providing a continuous indication of the cumulative percentage of permissible exposure has been described. Novel electronic circuitry for implementing various portions of a noise exposure computer have also been described.

Having, then, described a preferred embodiment of this invention, together with options and modifications thereto, and it being apparent that various modifications in component selection, circuit design, and levels of operation will become apparent to those skilled in the art without departing from the spirit and scope of the invention, what is intended to be protected by Letters Patent is set forth in the appended claims.

We claim:

1. A noise exposure computer capable of being worn on the person for indicating the percentage of permissible noise exposure experienced by that person, the computer comprising: microphone means for sensing incident noise levels and converting said noise levels to input electrical signals; input amplifying and weighting network means for providing frequency weighted signals in response to said input electrical signals; shielded cable means having a predetermined length coupling said microphone means to said input amplifying and weighting network means for applying said input electrical signals to said input amplifying and weighting network means and permitting a wearer to support said microphone means relatively close to his ears, and line driving circuit means coupled intermediate said microphone means and said shielded cable means for converting a relatively high input impedance to a relatively low output impedance for driving said shielded cable means; rectifying means coupled to said input amplifying and weighting network means for providing root means square voltage levels in response to said frequency weighted signals; a variable-gain ratio amplifier means coupled to said rectifying means for providing predetermined changes in voltage levels in response to predetermined changes in said incident noise levels; computing means coupled to said variable-gain ratio amplifier means for providing signals indicative of the duration of occurrence of incident noise levels divided by the maximum permissible durations of each of said incident noise levels; and means coupled to said computing means for providing signals indicative of the cumulative percentage of the total predetermined permissible noise exposure that has been experienced.

2. A noise exposure computer as in claim 1 wherein first circuit means in said line driving circuit means in combination with the capacitance in said microphone means provide a first portion of said weighting of said input electrical signals; said weighting network means includes second circuit means coupled intermediate said shielded cable means in said input amplifying means for providing a second portion of said weightng of said input electrical signals; said amplifying means includes operational amplifier means having an output terminal and first and second input terminals, said first input terminal coupled to said second circuit means for amplifying the weighted input electrical signals, and third circuit means coupled intermediate said output terminal and said second input terminal of said operational amplifier means for providing a third portion of said weighting of said input electrical signals.

3. A noise exposure computer as in claim 1 wherein said variable-gain ratio amplifier means includes input means coupled to said rectifying means for receiving said root mean square voltage levels; operational amplifier means having a first input terminal coupled to said input means, a second input terminal, and an output terminal; feedback means coupled intermediate said output terminal and said second input terminal of said operational amplifier means, said feedback means including resistor means and unidirectional conducting means for automatically varying the gain of said operational amplifier means in response to changes in said root mean square voltage levels causing changes in conduction through said resistor means and said unidirectional conducting means.

4. A noise exposure computer as in claim 3 wherein said feedback means includes manually adjustable resistor means for permitting calibration of said variable-gain ratio amplifier means, and said unidirectional conducting means includes a first diode means having a first conduction switching characteristic for varying amplification of said operational amplifier means in a first predetermined range of said root mean square voltage levels, and at least a second diode means having a second conduction characteristic for varying amplification in said operational amplifier means in a second predetermined range of said root mean square voltage level.

5. A noise exposure computer as in claim 1 wherein said variable-gain ratio amplifier means includes input means coupled to said rectifying means for receiving said root mean square voltage level; variable-gain amplifier means coupled to said input means; and automatic gain-change circuit means coupled to said amplifier means for varying the gain of said variable-gain amplifier means to provide predetermined decibel output voltage changes from said variable-gain amplifier means in response to changes in said root mean square voltage levels representative of predetermined decibel changes in said measured incident noise levels.

6. A noise exposure computer capable of being worn on the person for indicating the percentage of permissible noise exposure experienced by that person, the computer comprising: means for sensing incident noise levels and converting said noise levels to input electrical signals; input amplifying and weighting network means for providing frequency weighted signals in response to said input electrical signals; rectifying means coupled to said input amplifying and weighting network means for providing root means square voltage levels in response to said frequency weighted signals; and a variable-gain ratio amplifier means coupled to said rectifying means for providing predetermined changes in voltage levels in response to predetermined changes in said incident noise levels; computing means coupled to said variable-gain ratio amplifier means for providing signals indicative of the duration of occurrence of incident noise levels divided by the maximum permissible durations of each of said incident noise levels; and means coupled to said computing means for providing signals indicative of the cumulative percentage of the total predetermined permissible noise exposure that has been experienced; said rectifying means including phase-shift means having first and second output terminals and an input terminal coupled to said input amplifying means for providing in-phase weighted signals at said first output terminal, and phase-shifted signals comprising said weighted signals shifted 180 degrees out of phase with said in-phase signals at said second output terminal; first operational amplifier means having a first input terminal coupled to said first output terminal of said phase-shift means, a second input terminal, and an output terminal; first unidirectional conducting means coupled to said output terminal of said first operational amplifier means for rectifying said in-phase signals; second operational amplifier means having a first input terminal coupled to said second output terminal of said phase-shift means, a second input terminal, and an output terminal; second unidirectional conducting means coupled to said output terminal of said second operational amplifier means for rectifying said phase-shifted signals; feedback circuit means coupled to said first and second unidirectional conducting means and said second input terminals of said first and second operational amplifier means; and root means square circuit means having an input terminal coupled to said first and second unidirectional conducting means and an output terminal for providing root mean square voltage levels for said rectified in-phase signals and said rectified phase-shifted signals.

7. A noise exposure computer capable of being worn on the person for indicating the percentage of permissible noise exposure experienced by that person, the computer comprising: means for measuring incident noise levels and converting measured noise levels to electrical signals indicative of said measured noise levels; variable-gain ratio amplifier means coupled to said noise level measuring means for automatically providing predetermined changes in voltage levels in response to predetermined changes in said incident noise levels; computing means coupled to said variable-gain ratio amplifier means for providing signals indicative of the duration of occurrence of incident noise levels divided by the maximum permissible durations of each of said incident noise levels; said computing means including integrator circuit means coupled to receive voltage levels from said variable-gain ratio amplifier means for providing an integrated signal that changes in voltage level at a rate proportional to said received voltage levels; comparator means coupled to said integrator means for sensing when said integrated signal has reached a predetermined level, said comparator means including comparator output means for providing reset signals when said integrated signals have reached said predetermined level; and switch means coupled to said comparator output means and to said integrator means for resetting said integrator means in response to said reset signals, said switch means including count output means for providing output count signals in response to said reset signals and noise exposure output means coupled to said computing means for providing signals indicative of the cumulative percentage of the total predetermined permissible noise exposure that has been experienced.

8. A noise exposure computer as in claim 7 wherein said noise exposure output means includes trigger circuit means having an input terminal coupled to said count output means and an output terminal for providing a trigger signal in response to each of said output count signals; and electro-mechanical counter means having a visually readable digit output, and having count advance means coupled to said output terminal of said trigger circuit means for altering said visually readable digit output in response to said trigger signals.

9. A noise exposure computer capable of being worn on the person for indicating the percentage of permissible noise exposure experienced by that person, the computer comprising: means for measuring incident noise levels and converting measured noise levels to electrical signals indicative of said measured noise levels; variable-gain ratio amplifier means coupled to said noise level measuring means for automatically providing predetermined changes in voltage levels in response to predetermined changes in said incident noise levels; computing means coupled to said variable-gain ratio amplifier means for providing signals indicative of the duration of occurrence of incident noise levels divided by the maximum permissible durations of each of said incident noise levels; noise level threshold determining means coupling said variable-gain ratio amplifier means to said computing means for sensing said voltage levels, said noise level threshold means including control circuit means for passing first predetrmined ones of said voltage levels to said computing means and inhibiting second predetermined ones of said voltage levels indicative of noise levels below a predetermined threshold level from passing to said computing means and noise exposure output means coupled to said computing means for providing signals indicative of the cumulative percentage of the total predetermined permissible noise exposure that has been experienced.

10. A noise exposure computer as in claim 9 wherein said noise level threshold determining means further includes reference voltage level means determining means coupled to said control circuit means for providing a reference voltage level indicative of said threshold noise level, said noise level threshold determining means including calibrating means for varying said reference voltage level.

11. A noise exposure computer capable of being worn on the person comprising: microphone means for sensing incident noise levels and converting said noise levels to input electrical signals; input amplifying and weighting network means for providing frequency weighted signals in response to said input electrical signals shielded cable means having a predetermined length coupling said microphone means to said input amplifying and weighting network means for applying said input electrical signals to said input amplifying and weighting network means and permitting a wearer to support said microphone means relatively close to his ears, and line driving circuit means coupled intermediate said microphone means and said shielded cable means for converting a relatively high input impedance to a relatively low output impedance for driving said shielded cable means; rectifying means coupled to said input amplifying and weighting network means to respond to said frequency weighted signals for providing root means square voltage levels as weighted voltage levels indicative of noise levels represented by said frequency weighted signals; a variable-gain ratio amplifier means coupled to said rectifying means to respond to said weighted voltage levels for providing predetermined changes in output voltage levels in response to predetermined changes in the level of said weighted voltage levels representative of predetermined changes in the sensed incident noise levels; voltage-to-frequency converter means coupled to said variable-gain amplifier means for providing count signals at a frequency in proportion to said output voltage levels; and output means coupled to said voltage-to-frequency converter means for providing a visually readable manifestation in response to said count signals, said manifestations indicative of the cumulative percentage of total predetermined noise exposure that has been experienced.

12. A noise exposure computer as in claim 11 wherein first circuit means in said line driving circuit means in combination with the capacitance in said microphone means provide a first portion of said weighting of said input electrical signals; said weighting network means includes second circuit means coupled intermediate said shielded cable means in said input amplifying means for providing a second portion of said weighting of said input electrical signals; said amplifying means includes operational amplifier means having an output terminal and first and second input terminals, said first input terminal coupled to said second circuit means for amplifying the weighted input electrical signals, and third circuit means coupled intermediate said output terminal and said second input terminal of said operational amplifier means for providing a third portion of said weighting of said input electrical signals.

13. A noise exposure computer as in claim 11 wherein said variable-gain ratio amplifier means includes input means coupled to said rectifying means for receiving said root mean square voltage levels; operational amplifier means having a first input terminal coupled to said input means, a second input terminal, and an output terminal; feedback means coupled intermediate said output terminal and said second input terminal of said operational amplifier means, said feedback means including resistor means and switching conducting means for automatically varying the gain of said operational amplifier means in response to changes in said root mean square voltage levels causing changes in conduction through said resistor means and said unidirectional conducting means.

14. A noise exposure computer as in claim 13 wherein said feedback means includes adjustable means for permitting calibration of said variable-gain ratio amplifier means, and said switching conducting means includes a first diode means having a first conduction switching characteristic for varying amplification of said operational amplifier means in a first predetermined range of said root mean square voltage levels, and at least a second diode means having a second conduction characteristic for varying amplification in said operational amplifier means in a second predetermined range of said root mean square voltage level.

15. A noise exposure computer as in claim 11 wherein said variable-gain ratio amplifier means includes input means coupled to said rectifying means for receiving said root mean square voltage level; variable-gain amplifier means coupled to said input means; and automatic gain-change circuit means coupled to said amplifier means for varying the gain of said variable-gain amplifier means to provide predetermined decibel output voltage changes from said variable-gain amplifier means in response to changes in said root mean square voltage levels representative of predetermined decibel changes in said measured incident noise levels for controlling the permissible duration of said noise levels.

16. A noise exposure computer capable of being worn on the person for indicating the percentage of permissible noise exposure experienced by that person, the computer comprising: means for sensing incident noise levels and converting said noise levels to input electrical signals; input amplifying and weighting network means for providing frequency weighted signals in response to said input electrical signals; rectifying means coupled to said input amplifying and weighting network means to respond to said frequency weighted signals for providing root means square voltage levels as weighted voltage levels indicative of noise levels represented by said frequency weighted signals; and a variable-gain ratio amplifier means coupled to said rectifying means to respond to said weighted voltage levels for providing predetermined changes in output voltage levels in response to predetermined changes in the level of said weighted voltage levels representative of predetermined changes in the sensed incident noise levels; computing means coupled to said variable-gain ratio amplifier means for providing signals indicative of the duration of occurrence of incident noise levels divided by the maximum permissible durations of each of said incident noise levels; and means coupled to said computing means for providing signals indicative of the cumulative percentage of the total predetermined permissible noise exposure that has been experienced; said rectifying means including phase-shift means having first and second output terminals and an input terminal coupled to said input amplifying means for providing in-phase weighted signals at said first output terminal, and phase-shifted signals comprising said weighted signals shifted 180 degrees out of phase with said in-phase signals at said second output terminal; first operational amplifier means having a first input terminal coupled to said first output terminal of said phase-shift means, a second input terminal, and an output terminal; first unidirectional conducting means coupled to said output terminal of said first operational amplifier means for rectifying said in-phase signals; second operational amplifier means having a first input terminal coupled to said second output terminal of said phase-shift means, a second input terminal, and an output terminal; second unidirectional conducting means coupled to said output terminal of said second operational amplifier means for rectifying said phase-shifted signals; feedback circuit means coupled to said first and second unidirectional conducting means and said second input terminals of said first and second operational amplifier means; and root mean square circuit means having an input terminal coupled to said first and second unidirectional conducting means and an output terminal for providing root mean square voltage levels for said rectified in-phase signals and said rectified phase-shifted signals.

17. A noise exposure computer capable of being worn on the person comprising: noise level measuring means for measuring incident noise levels and converting measured noise levels to weighted voltage levels indicative of said measured noise levels; variable-gain ratio amplifier means coupled toaid noise level measuring means, including automatic gain-change means for automatically varying the gain of said variable-gain ratio amplifier means in response to said weighted voltage levels for causing said variable-gain ratio amplifier means to provide predetermined changes in output voltage levels in response to predetermined changes in level of said weighted voltage levels representation of predetermined changes in said measured incident noise levels; voltage-to-frequency converter means coupled to said variable-gain amplifier means for providing count signals at a frequency in proportion to said output voltage levels; said voltage-to-frequency converter means includes integrator circuit means coupled to receive voltage levels from said variable-gain ratio amplifier means for providing an integrated signal that changes in voltage level at a rate proportional to said received voltage levels; comparator means coupled to said integrator means for sensing when said integrated signal has reached a predetermined level, said comparator means including comparator output means for providing reset signals when said integrated signals has reached said predetermined level; switch means coupled to said comparator output means and to said integrator means for resetting said integrator means in response to said reset signals, said switch means including count output means for providing said count signals in response to said reset signals; and output means coupled to said voltage-to-frequency converter means for providing a visually readable manifestation in response to said count signals, said manifestations indicative of the cumulative percentage of total predetermined noise exposure that has been experienced.

18. A noise exposure computer as in claim 17 wherein said noise exposure output means includes trigger circuit means having an input terminal coupled to said count output means and an output terminal for providing a trigger signal in response to each of said output count signals; and display means having a visually readable digit output, and having count advance means coupled to said output terminal of said trigger circuit means for altering said visually readable digit output in response to said trigger signals.

19. A noise exposure capable of being worn on the person comprising: noise level measuring means for measuring incident noise levels and converting measured noise levels to weighted voltage levels indicative of said measured noise levels; variable-gain ratio amplifier means coupled to said noise level measuring means, including automatic gain-change means for automatically varying the gain of said variable-gain ratio amplifier means in response to said weighted voltage levels for causing said variable-gain ratio amplifier means to provide predetermined changes in output voltage levels in response to predetermined changes in level of said weighted voltage levels representation of predetermined changes in said measured incident noise levels; voltage-to-frequency converter means coupled to said variable-gain amplifier means for providing count signals at a frequency in proportion to said output voltage levels; noise level threshold determining means coupled to said variable-gain ratio amplifier means and said voltage-to-frequency converting means for sensing said output voltage levels, said noise level threshold means including control circuit means for passing first predetermined ones of said output voltage levels to said voltage-to-frequency converting means and inhibiting second predetermined ones of said output voltage levels indicative of noise levels below a predetermined threshold level from passing to said voltage-to-frequency converting means; and output means coupled to said voltage-to-frequency converter means for providing a visually readable manifestation in response to said count signals, said manifestations indicative of the cumulative percentage of total predetermined noise exposure that he has been experienced.

20. A noise exposure computer as in claim 19 wherein said noise level threshold determining means further includes reference voltage level means determining means coupled to said control circuit means for providing a reference voltage level indicative of said threshold noise level, said noise level threshold determining means including calibrating means for varying said reference voltage level.

21. A noise exposure computer capable of being worn on the person for expressing a visual indication of the percentage of permissible noise exposure experienced by that person comprising: noise level measuring means for measuring incident noise levels and providing signals indicative of said noise levels, said noise level measuring means including weighting means for modifying said electrical signals by weighting predetermined frequency ranges in said electrical signals, and including rectifying means for providing voltage levels indicative of the noise levels represented by the weighted electrical signals; variable-gain amplifier means coupled to said noise level measuring means for provding variably amplified voltage levels in response to said voltage levels, said variable-gain ratio amplifier means including automatic gain-control means for altering the amplification factor of said amplifier means by predetermined different increments in response to increasing voltage levels; comparator means coupled to said variable-gain ratio amplifier means for comparing the variably amplified voltage levels to a predetermined reference voltage, said comparator means including threshold control circuit means for inhibiting further effectiveness of ones of said variably amplified voltage levels having a predetermined relationship to said reference voltage; voltage-to-frequency converter means coupled to said variable-gain amplifier means for providing count signals at a frequency in proportion to said amplified voltage levels, each of said count signals indicative a predetermined percentage of predetermined permissible noise exposure; and output means coupled to said voltage-to-frequency converter means for providing output manifestations in response to said count signals indicative of the cumulative percentage of total predetermined noise exposure that has been experienced.

22. The method of determining the percentage of permissible noise exposure that has been experienced comprising the steps of:

a. sensing incident noise levels and providing electrical signals indicative of the sensed noise levels;

b. weighting the electrical signals for predetermined frequency ranges;

c. rectifying the weighted electrical signals and determining the root mean square voltage levels of the rectified signals;

d. variably amplifying the root mean square voltage levels for determining a time base for the sensed noise level;

e. comparing the amplified voltage levels to a reference voltage level indicative of a predetermined threshold noise level, and disregarding any amplified voltage level that is below said reference voltage level;

f. converting said amplified voltage levels above said reference voltage level to count signals occurring at a frequency in proportion to said amplified voltage levels; and g. displaying said count signals as the cumulative percentage of total predetermined noise exposure that has been experienced.

* * * * *

UNITED STATES PATENT OFFICE
CERTIFICATE OF CORRECTION

Patent No. 3,747,703 dated July 24, 1973

Inventor(s) Michael J. Knowd & Charles E. Sullivan

It is certified that error appears in the above-identified patent and that said Letters Patent are hereby corrected as shown below:

Column 3, line 63, change "relation-ship" to --relationship--.

Column 8, line 51, change "smapling" to --sampling--.

Column 9, line 33, change "lien" to --line--.

Column 10, line 24, change "144" to --134--.

Column 11, line 42, change "pulse" to --plus--.

Column 13, In Table III change "Gain count" to --Gain--, and change "Periods" to --Count Periods--.

Column 14, line 57, change "slow" to --below--.

Column 15, line 2, change "no N-inverting" to --non-inverting--.

Column 15, line 36, change "R27" to --R25--.

Column 16, line 2, change "when" to --When--.

Column 17, line 67, change "RQ6" to --Q6--.

Column 18, line 25, change "counte" to --counter--.

Column 18, line 27, change "." to --,--.

UNITED STATES PATENT OFFICE

CERTIFICATE OF CORRECTION

Patent No. 3,747,703 Dated July 24, 1973

Inventor(s) Michael J. Knowd & Charles E. Sullivan Page 2

It is certified that error appears in the above-identified patent and that said Letters Patent are hereby corrected as shown below:

Column 18, line 28, change "Thereby" to --thereby--.

Column 25, line 44, change "toaid" to --to said--.

Signed and sealed this 6th day of August 1974.

(SEAL)
Attest:

McCOY M. GIBSON, JR.
Attesting Officer

C. MARSHALL DANN
Commissioner of Patents